(12) United States Patent
Seguin

(10) Patent No.: US 12,393,653 B2
(45) Date of Patent: *Aug. 19, 2025

(54) SYSTEMS AND METHODS FOR PROVIDING A DIGITAL CONTENT ITEM TO AN AUTHORIZED USER

(71) Applicant: Third Iron, LLC, Hugo, MN (US)

(72) Inventor: John L. Seguin, Maple Grove, MN (US)

(73) Assignee: Third Iron, LLC, Hugo, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 18/371,988

(22) Filed: Sep. 22, 2023

(65) Prior Publication Data

US 2024/0129358 A1    Apr. 18, 2024

Related U.S. Application Data

(63) Continuation of application No. 17/868,499, filed on Jul. 19, 2022, now Pat. No. 11,790,052, which is a
(Continued)

(51) Int. Cl.
*G06F 21/31* (2013.01)
*H04L 67/01* (2022.01)
(Continued)

(52) U.S. Cl.
CPC .............. *G06F 21/31* (2013.01); *H04L 67/01* (2022.05); *H04L 67/55* (2022.05); *H04L 67/75* (2022.05); *G06F 21/1015* (2023.08); *H04L 67/02* (2013.01)

(58) Field of Classification Search
CPC ......... H04L 67/01; H04L 67/02; H04L 67/55; H04L 67/75; G06F 21/31
See application file for complete search history.

(56) References Cited

U.S. PATENT DOCUMENTS

| | | |
|---|---|---|
| 6,859,791 B1 | 2/2005 | Spagna et al. |
| 6,983,371 B1 | 1/2006 | Hurtado et al. |

(Continued)

OTHER PUBLICATIONS

International Search Report and Written Opinion dated May 6, 2020 for PCT/US2020/020894 (10 pages).

*Primary Examiner* — Kristie D Shingles
(74) *Attorney, Agent, or Firm* — Foley & Lardner LLP

(57) ABSTRACT

Systems and methods for providing a digital content item to an authorized user are described. A system for providing access to a digital content item comprises a network interface, a memory, and one or more processors, the one or more processors to process a user request to obtain a digital resource identifier corresponding to a user-requested digital content item; select a digital resource provisioning platform to provide the user-requested digital content item, the selection based on holdings availability data; generate a link to the user-requested digital content item on the selected digital resource provisioning platform based on one or more rules specific to the selected digital resource provisioning platform; and provide to the user's computing device the link to the user-requested digital content item on the selected digital resource provisioning platform, the link to navigate a user interface directly to a view of the digital content item responsive to a selection of the link.

20 Claims, 7 Drawing Sheets

Related U.S. Application Data continuation of application No. 16/292,206, filed on Mar. 4, 2019, now Pat. No. 11,409,842.

(51) Int. Cl.
  *H04L 67/55* (2022.01)
  *H04L 67/75* (2022.01)
  *G06F 21/10* (2013.01)
  *H04L 67/02* (2022.01)

(56) References Cited

U.S. PATENT DOCUMENTS

| | | |
|---|---|---|
| 8,473,487 B1 | 6/2013 | Verstak et al. |
| 9,842,218 B1* | 12/2017 | Brisebois ............... H04L 63/101 |
| 10,129,289 B1* | 11/2018 | Yang ........................ H04L 63/20 |
| 10,628,408 B2* | 4/2020 | Jin ....................... G06Q 10/0635 |
| 11,087,761 B2* | 8/2021 | Ward ................... G10L 15/1822 |
| 11,409,842 B2 | 8/2022 | Seguin |
| 2002/0035697 A1 | 3/2002 | McCurdy et al. |
| 2003/0046182 A1 | 3/2003 | Hartman |
| 2007/0011094 A1 | 1/2007 | Manchala |
| 2008/0010319 A1 | 1/2008 | Vonarburg et al. |
| 2010/0114936 A1 | 5/2010 | Gupta |
| 2010/0250271 A1 | 9/2010 | Pearce et al. |
| 2010/0262515 A1 | 10/2010 | Brewer |
| 2012/0131683 A1* | 5/2012 | Nassar ................... G06F 21/604 726/28 |
| 2013/0198609 A1 | 8/2013 | Mokhtarzada et al. |
| 2013/0219262 A1 | 8/2013 | Becker et al. |
| 2014/0237540 A1 | 8/2014 | King et al. |
| 2015/0286737 A1 | 10/2015 | Cattone et al. |
| 2016/0034305 A1* | 2/2016 | Shear .................... G06F 16/285 707/722 |
| 2016/0149956 A1* | 5/2016 | Birnbaum ............. H04L 63/101 726/1 |
| 2017/0154376 A1* | 6/2017 | Mirchandani ...... G06Q 30/0641 |
| 2017/0372043 A1 | 12/2017 | Hurst et al. |
| 2018/0063192 A1* | 3/2018 | McGuire ............ G06F 16/9535 |
| 2018/0375886 A1* | 12/2018 | Kirti ....................... H04L 67/10 |
| 2019/0132218 A1* | 5/2019 | Senarath ................ H04L 41/18 |
| 2019/0278924 A1* | 9/2019 | Zhang ................ H04L 63/0861 |

* cited by examiner

_US 12,393,653 B2_

SYSTEMS AND METHODS FOR PROVIDING A DIGITAL CONTENT ITEM TO AN AUTHORIZED USER

RELATED APPLICATIONS

This application is a continuation of U.S. patent application Ser. No. 17/868,499, filed Jul. 19, 2022 and titled SYSTEMS AND METHODS FOR PROVIDING A DIGITAL CONTENT ITEM TO AN AUTHORIZED USER, which is a continuation of U.S. patent application Ser. No. 16/292,206, filed Mar. 4, 2019 and titled SYSTEMS AND METHODS FOR PROVIDING A DIGITAL CONTENT ITEM TO AN AUTHORIZED USER, the entirety of each of which is incorporated herein by reference.

BACKGROUND

Access to digital resources via the Internet is a principal component of modern information sharing. Organizations wishing to control access to certain digital resources, such as digital content items that may have desired features (e.g. copyrights, information, intrinsic value) that they host on the Internet can put systems in place that require a user to authenticate that he or she is an authorized user of the content before the user is given access to the hosted digital content items. Current systems for controlling access to digital content items hosted on the Internet (or other network) in this manner are fragmented and incomplete, and lack the functionality that can facilitate straightforward access to the hosted content by authorized users.

BRIEF SUMMARY

The present disclosure provides embodiments of computer-implemented systems and methods of providing one or more authorized users with access to a digital resource.

DETAILED DESCRIPTION

Figure 1:
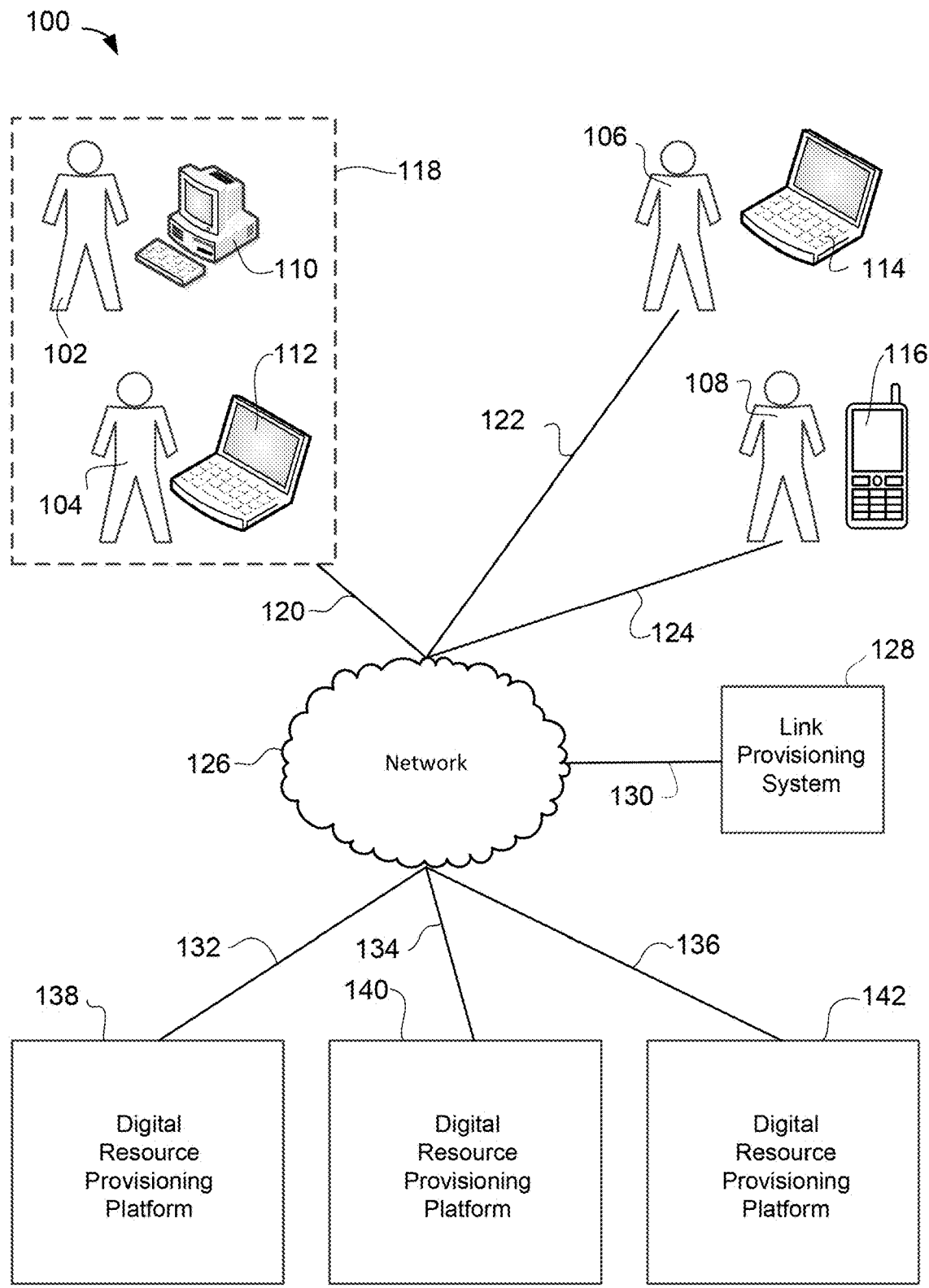
FIG. 1 illustrates a system for providing access to a digital resource, in accordance with an embodiment of the present disclosure.

The Internet can be used to provide digital resources to remote users. A digital resource may be any information resource that can be delivered and processed using a digital computer. A digital content item may be a type of digital resource. A digital content item may be a digital resource that reflects an entirety of a complete work of a creator in a form as that creator intended it to be viewed or otherwise experienced or consumed in its original form. For example, a digital content item may be, e.g., an electronic copy of a work that is subject to copyright, such as an academic article or a music recording. A digital content item may be, for example, a PDF document, an image, a dataset, an ePUB document, an audio file, a video file, or other types of digital content. Some digital content items may be digital documents (e.g., PDF documents and/or ePUB documents). For purposes of this disclosure, a digital content item may be different than, e.g., a digital resource that includes only an abstract containing information about (e.g., a summary of) and that may be a different type of digital resource other than a digital content item). While much of the disclosure is directed to systems and methods for providing digital content items to an authorized user, it is anticipated that in some cases it may be desirable to adapt the systems and methods described could be adapted to use categories of digital resources other than, or in addition to, digital content items.

In many cases, access over the Internet to a digital resource, or more specifically, a digital content item, may involve a user requesting that digital content item from one of one or more digital resource provisioning platforms hosting the digital content item. The selected digital resource provisioning platform may require the user to first authenticate (to the digital resource provisioning platform) that the user is an authorized user before the digital resource provisioning platform provides access to the digital content item. The method of authenticating a user is not typically consistent between various platforms. Further, in order to access a digital content item on a given platform, a user may further be required to navigate an interface (perhaps requiring the user to click through more than one graphical interface or article abstract page) that, again, is typically not consistent between various digital resource provisioning platforms. These variations in methods of user authorization and/or navigation may confuse and frustrate the user, increasing the time and effort required for the user to gain access to a given digital content item.

For the benefit of their patrons, libraries (and other institutions) often subscribe to content that is hosted on one or more digital resource provisioning platforms. Some examples of digital resource provisioning platforms to which a library might be subscribed may include an EBSCO platform, a Wiley platform, and a Springer platform. A digital resource provisioning platform may be a direct publisher of the content it hosts and makes available on a subscription basis, or it may more simply license content that it makes available from another publisher (e.g., a platform that acts as a content aggregator). A library may make individual agreements with the one or more digital resource provisioning platforms to which the library is subscribed, or the subscription may occur with the library acting as one member of a consortia.

Patrons of these libraries may have access to the content subscribed to by the library on these digital resource provisioning platforms by nature of the patrons' physical presence at the library. For example, a computer located at the library may be configured to allow patrons physically interacting with the computer to access content on one or more digital resource provisioning platforms to which the library is subscribed. In some cases, the library patron is authorized because the patron is using library-owned equipment that itself has permission (or authorization) to access the content on the one or more digital resource provisioning platforms. This permission may have been determined based on, e.g., the library-owned equipment's use of a pre-authorized Internet Protocol (IP) address assigned to the library and known to the digital resource provisioning platform.

Patrons of these libraries may further have access to the content subscribed to by the library on various digital resource provisioning platforms by nature of the patrons' ability to authenticate themselves as pre-authorized users of the library's resources. For example, a user may be able to search a library catalog (which may include information regarding content subscribed to by the library on one or more digital resource provisioning platforms) in order to locate a specific item on one or more of the subscribed-to resource provisioning platforms. This search may take place at the library on library equipment, or may instead take place at a location other than the library on non-library-owned equipment (such as a search of the library catalog performed remotely over the Internet on a laptop in a personal residence). Once a digital content item is located on a digital resource provisioning platform by using the library search system, the user may then be asked to verify that he or she is a pre-authorized user of the library's resources by providing credentials (e.g., a username and/or a password) to a computer system of the library. Only if the user can successfully authenticate himself or herself as a pre-authorized user of the library's resources will the user be permitted to access the content subscribed to by the library on the one or more digital resource provisioning platforms.

In either access case, it may be that the library search system is able to discover more than once source for the requested item of content. The library search system may locate the requested item of content on zero, one, or more than one of the digital resource provisioning platforms to which the library is subscribed. It may also be possible that the library search system can locate an item of content that is accessible elsewhere on a non-subscription basis. A link resolver may use information about the library's holdings data and the sources (including dates or other serialization information for which the subscription is valid for only part of a serialized source) where the user can access the material as part of this discovery process.

Once an item of content has been located in one or more places as described above, the library search system may present to the user a list of one or more links to one or more digital resource provisioning platforms where the user can access the digital content item. This list may include specific information about the access method that will be used should that particular link be selected (e.g., a description of the specific resource provisioning platform or other hosting service). The list may further include information about the parts of a resource to which the library has access through the particular resource provisioning platform (e.g., which volumes and issues of an academic journal containing the searched-for digital content item are available to the library via the given link to the given digital resource provisioning platform).

The list may cause the user some confusion if the user is unfamiliar with any of the listed digital resource provisioning platforms and/or the current subscription relationship between the library and a listed digital resource provisioning platform. This list may also fail to note that some access methods will be more straightforward for the user (after clicking through the link) than other methods. Finally, the very existence of this list itself may confuse a user who was not anticipating the need to select a specific access method.

Even were the user to successfully understand the list and click an appropriate link, the system may go on to request that the user authenticate, if necessary (e.g., as a pre-authorized user of the library system in the manner described above), and/or to present the user an article abstract page on the selected digital resource provisioning platform for the given digital content item, with the expectation that the user will then navigate through the article abstract page in such a manner as to eventually access the actual digital content item that the user is interested in.

Such article abstract pages are usually unique to the individual digital resource provisioning platform, which means in practice that an article abstract page on one digital resource provisioning platform very likely looks different from an article abstract page on another digital research provisioning platform. Each time a user arrives at an unfamiliar article abstract page, the user must patiently invest the time to discover how to navigate through the article abstract page (or pages) corresponding to the particular digital research provisioning platform in order to actually access the digital content item. The additional requirement to navigate these individual article abstract pages in order to actually access the digital content item delays the user, presents additional opportunities for user confusion, and may tax the user's patience.

The systems and methods disclosed herein address these and other barriers and provide a superior user experience. For example, a user may perform a search for a digital content item on a library search system. The search of the library system may return one or more search results containing a unique digital resource identifier for the digital content item. One example of a digital resource identifier is a Digital Object Identifier (DOI), which may be a string that uniquely corresponds to a particular digital content item, and is the same even on the separate resource provisioning platforms. Another example of a digital resource identifier is a PubMed identifier (PMID), which may be a number used to uniquely identify, e.g., a digital content item relevant to the life sciences field. Other types of digital resource identifiers are contemplated.

To the extent that a digital resource identifier corresponding to an item in a given search result provided by the library search system can be determined, the system disclosed herein eschews the need for a presentation of a source list to the user after the user presents the digital resource identifier to the system (e.g., by clicking on a link in the search result). The system may automatically select a digital resource provisioning platform from which to pull the searched-for digital content item. Further, rather than presenting the user at an article abstract page unique to the selected resource provisioning platform after the user clicks the search result, the system can be further configured to, when possible, simply locate and/or generate a direct link to the digital content item on the automatically selected digital research provisioning platform. The system may present this direct link to the user. For example, the system may integrate this link into the search result of the library search system as initially provided to the user of the library search system. In order to access the digital content item, the user of the library search system can simply click on or otherwise use the link provided to be directly presented with the digital content item corresponding to the search result.

While the preceding discussion has discussed the generation of a user request by using, e.g., certain library search systems, it is contemplated that the systems disclosed herein could be used with any other method that a user may use to provide the system with a user request containing a unique digital resource identifier (e.g., a DOI, in the case of academic articles) for a specific digital content item hosted on one or more digital resource provisioning platforms.

FIG. 1 illustrates a system 100 for providing access to a digital content item, in accordance with an embodiment of the disclosure. FIG. 1 includes a first user 102, a second user 104, a third user 106, and a fourth user 108. FIG. 1 further includes a first user device 110 (e.g., a client computing device) being used by the first user 102, a second user device 112 (e.g., a client computing device) being used by the second user 104, a third user device 114 being used by the third user 106, and a fourth user device 116 being used by the fourth user 108. Each of the user devices 110-116 may be any user device capable of interfacing with a network 126. For example, the first user device 110 may be a desktop computer, the second user device 112 and the third user device 114 may be laptops, and the fourth user device 116 may be a smartphone, each connected to the network 126.

The first user 102 and the second user 104 may operate the first user device 110 and the second user device 112 on a computer network of an institution (e.g., a library) 118. This may mean that the first user device 110 and the second user device 112 are physically present on a campus of the institution 118 and thus have an actual (e.g., actual physical or actual wireless) connection to the network of the institution 118. It may also mean that any of the first user device 110 and the second user device 112 are virtually present on a campus of the institution 118 and thus have a virtual connection to the network of the institution 118 (e.g., via a Virtual Private Network (VPN) connection). The first user 102 and the second user 104 may be affiliates of the institution 118 by nature of their use of the first user device 110 and the second user device 112, which are present (whether actually or virtually) on the institution network. The institution network may connect to the network 126 via network connection 120.

The third user 106 and the fourth user 108 may operate the third user device 114 and the fourth user device 116 from outside a computer network of the institution 118. Either of the third user 106 and the fourth user 108 may be affiliated with the institution 118 by nature of their ability to authenticate with a computer system of the institution 118 from outside the network of the institution 118. For example, the third user 106 may be able to authenticate as an affiliate of the institution 118 by remotely logging in to a computer system of the institution 118 with a recognized username and password combination while using the third device 114. This authentication process also contemplates, e.g., SAML-based authentication of a software session running on a user device with a computer system of the institution 118. This authentication process may also include presenting a recognized username and password to, e.g., a proxy server of the institution 118, which may then allow the user device to route network traffic through the proxy server of the institution 118.

It may be that either of users 106-108 is not an affiliate of the institution 118 (or any other institution which utilizes the link provisioning system 128, described below). This can occur when, e.g., one of the devices 114-116 is not present (whether actually or virtually) on the network of the institution 118, and when one of the users 106-108 using that device 114-116 cannot authenticate with a computer system of the institution 118 (or there is no computer system of the institution 118 configured to handle outside authentication methods).

Each of the users 102-108 may interact with the network 126 through one of a first network connection 120, a second network connection 122, and a third network connection 124 (with the first user 102 and the second user 104 sharing the network connection 120 between the network of the institution 118 and the network 126). The network 126 may be configured to allow for communication between each of the devices/systems connected to the network 126 that are discussed herein.

The network 126 may further connect to a link provisioning system 128 over a network connection 130. The digital resource provisioning platforms 138, 140, and 142 may also connect to the network 126 via each of the respective network connections 132, 134, and 136. The link provisioning system 128 may be configured to accept user requests for identified digital content items from any of the users 102-108 using any of the user devices 110-116 and to respond with a direct link to the requested digital content item on one of the digital resource provisioning platforms 138-142. As will be described in more detail below, the link provisioning system 128 may allow the user request for a digital content item from one of the digital resource provisioning platforms 138-142 to be handled in a manner that more efficiently delivers electronic content and can save the user 102-108 valuable time and effort over other available methods.

The digital resource provisioning platforms 138-142 may each host one or more digital content items. Access to these digital content items may be freely given by the digital resource provisioning platform 138-142. Alternatively, it may be that access to one or more digital content items on a resource provisioning platform 138-142 is granted only based on a subscription model and given only to authorized users.

The link provisioning system 128 may accept user requests for a digital content item hosted on one or more of the digital resource provisioning platforms 138-142. These requests may be generated by any of users 102-108 using their respective user devices 110-116. These user requests may contain a digital resource identifier (e.g., a DOI for an academic article).

In some cases, the user requests may also include an entity identifier. An entity may be, e.g., an institution, such as the institution 118, that maintains a subscription to or can otherwise access the content on one or more of the digital resource provisioning platforms 138-142. In these cases, the entity identifier included in the user request may be an institution identifier for the institution (such as, for example, the institution 118). The use of the institution identifier in the user request may be possible because the user is an affiliate of the identified institution. An entity identifier that is an institution identifier may associate the user making the user request with the institution entity identified by the institution identifier by nature of the use of the institution identifier in the user request.

An entity may also be, e.g., an individual user that instead maintains a personal subscription to or can otherwise access content on one or more of the digital resource provisioning platforms 138-142. In these cases, the entity identifier included in the user request may be a user identifier for the individual user. An entity identifier that is a user identifier may associate the user making the user request with the user entity identified by the user identifier by nature of the use of the user identifier in the user request.

Using methods discussed below, the link provisioning system 128 may be capable of using the digital resource identifier (and, in some cases, an entity identifier) contained in a user request in conjunction with data regarding the digital content items hosted by the digital resource provisioning platforms 138-142 to generate a direct link that, when activated by the users 102-108 on their respective user devices 110-116, is configured to automatically and immediately present a user 102-108 with the requested digital content item without first requiring the user 102-108 to expend the time and effort to perform one or all of the authentication verification, digital resource provisioning platform selection, and article abstract page navigation chores described above. The link provisioning system 128 may be configured to function with any number of entities (e.g., any number of users and/or any number of institutions) and with any number of digital resource provisioning platforms.

Figure 2:
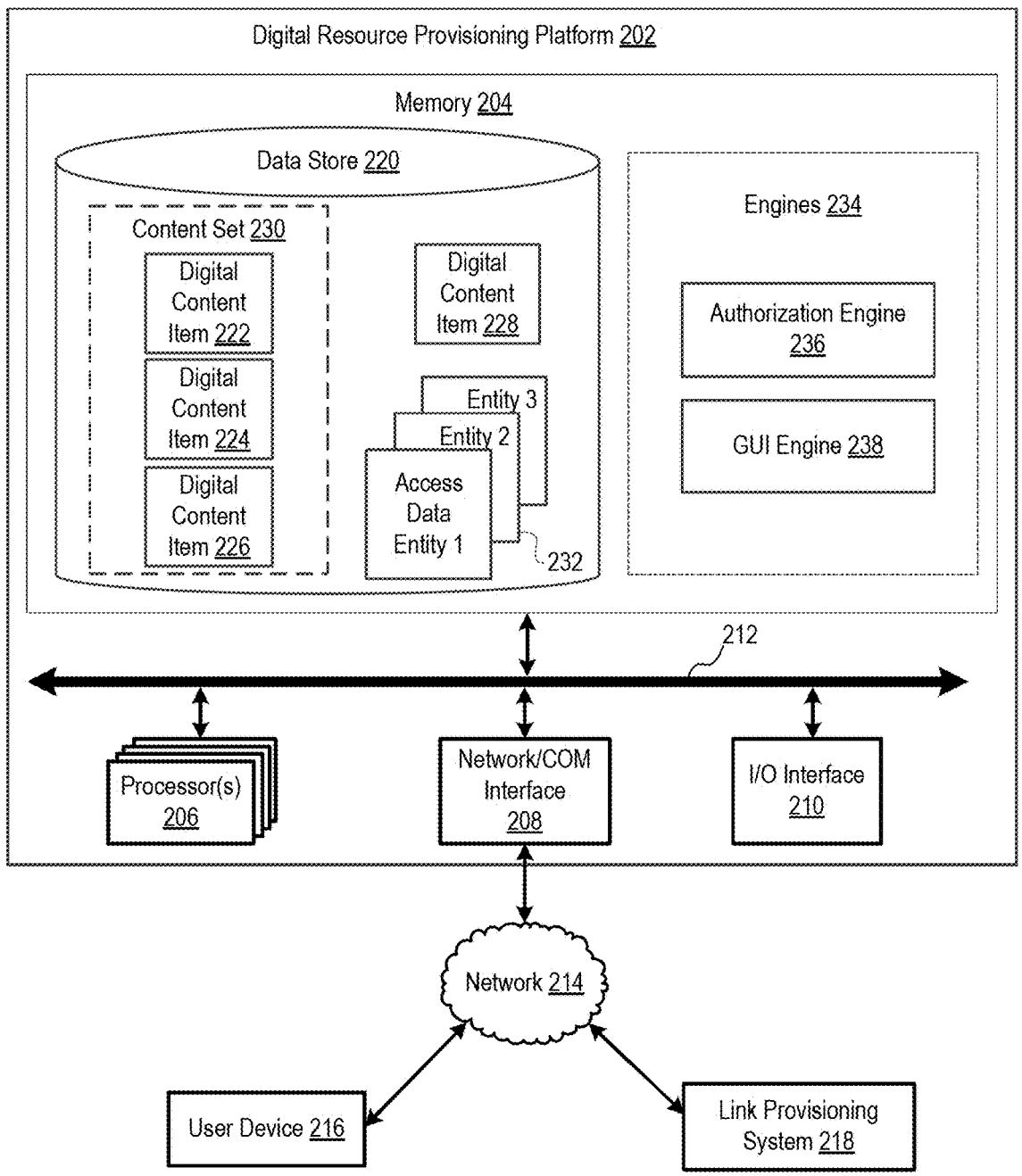
FIG. 2 illustrates a system in accordance with an embodiment of the present disclosure.

FIG. 2 illustrates a system 200 in accordance with an embodiment of the disclosure. FIG. 2 includes a detailed view of a digital resource provisioning platform 202. The digital resource provisioning platform 202 may be any one of the digital resource provisioning platforms 138-142 of FIG. 1.

The digital resource provisioning platform 202 may include a memory 204, one or more processors 206, a network/COM interface 208, and an input/output (I/O) interface 210, which may all communicate with each other using a system bus 212. The network/COM interface 208 of the digital resource provisioning platform 202 may be connected to a network 214 and may act as a reception and/or distribution device for computer-readable instructions. This connection may facilitate the transfer of information (e.g., computer-readable instructions) from the digital resource provisioning platform 202 to and from a user device 216 and to and from a link provisioning system 218. The user device 216 may be similar to any one of the user devices 110-116 of FIG. 1. The network 214 may be the network 126 of FIG. 1. The link provisioning system 218 may be similar to the link provisioning system 128 of FIG. 1.

The memory 204 of the digital resource provisioning platform 202 may include a data store 220. The data store 220 may hold a first digital content item 222, a second digital content item 224, a third digital content item 226, and a fourth digital content item 228. The data store 220 may also hold the first, second, and third digital content item 222-226 in a content set 230. The data store 220 may further include access data 232.

Each digital content item 222-228 of memory 204 may represent an "item" of digital content from the point of view of a user of the system 200. For example, one or more of the digital content items 222-228 may be an academic journal article. Alternatively, one or more of the digital content items 222-228 may be a dataset. One or more of the digital content items 222-228 may be a set of health information regarding a medical patient, an audio file, a video file, or any other digital content item capable of being hosted on the digital resource provisioning platform 202.

The digital content items 222-226 are grouped as content items of a content set 230. The content set 230 may be defined based on publishing relationship parameters. For example, the content set 230 may be configured to include some or all of the digital content items hosted on the digital resource provisioning platform 202 that belong to a certain academic journal. In this case, each of the first, second, and third digital content items 222-226 may be articles from that same academic journal, and it may be that the fourth digital content item 228 is left out of the content set 230 because it is not an article of the academic journal. Alternatively, the content set 230 may be configured to include some or all of the digital content items hosted on the resource provisioning platform 202 that are related to a certain object of study. In this case, each of the first, second, and third digital content items 222-226 may be a dataset including measurements about the object of study, and it may be that the fourth digital content item 228 is not a dataset including measurements about the object of study. Other groupings of digital content items into content sets, such as groupings of health information for a plurality of patients, are contemplated.

The content set 230 may be defined based on other parameters, either alone or in combination with the publishing relationship parameters described above. The content set 230 may be defined by subscription parameters. For example, the content set 230 may be configured to include only some of the articles of a certain academic journal that are hosted on the digital resource provisioning platform 202. This may allow an operator of the digital resource provisioning platform 202 to offer different content sets containing different sets of articles of an academic journal to different subscribers to the digital resource provisioning platform 202.

The content set 230 (or any other content set) of the digital resource provisioning platform 202 may include any number (including only one) of the digital content items hosted on the digital resource provisioning platform 202. It is not required that the individual digital content items included in the content set 230 (or any other content set) be related in an apparent fashion.

The access data 232 may include information regarding the ability of one or more entities to access one or more of the digital content items 222-228 (or any other digital content items) hosted on the digital resource provisioning platform 202. For example, the access data 232 may record which entities have subscribed to which of the digital content items 222-228 (or which of the content sets containing digital content items) hosted by the digital resource provisioning platform 202. An entity may be, e.g., an institution, such as the institution 118 of FIG. 1. An entity may also be, e.g., an individual user that maintains a personal subscription with the digital resource provisioning platform 202.

In addition to the data store 220, the memory 204 of the digital resource provisioning platform 202 may further include engines 234. These engines 234 may include an authorization engine 236 and a Graphical User Interface (GUI) engine 238. Certain operations that may be performed by each of these engines will be described below.

An authorization engine 236 of the digital resource provisioning platform 202 may operate in the following way: An entity may make a request for one of the digital content items 222-228 (or another digital content item) hosted by the digital resource provisioning platform 202. When this request arrives at the digital resource provisioning platform 202 from the network 214, the authorization engine 236 of the digital resource provisioning platform 202 may identify the entity making the request. It may then proceed to determine, using the information corresponding to that entity contained in access data 232, whether that entity may access the requested digital content item 222-228. The authorization engine 236 may accordingly cause the digital resource provisioning platform 202 to provide the requested digital content item 222-228 (or not). An entity may be identified by a username and password, by an IP address that has been used to transmit the request, by an authenticated software session running on the user device making the request, or by any other authentication method known to persons with ordinary skill in the art.

A GUI engine 238 of the digital resource provisioning platform 202 may operate in the following way: A user may operate a link configured to lead to an article abstract page for one or more of the digital content items 222-228 (or another digital content item) that is hosted on the digital resource provisioning platform 202. The GUI engine 238 may draw the visual elements of the article abstract page that are presented to the user. These visual elements of the article abstract page may include an element that, when clicked or otherwise operated on by the user, subsequently displays the digital content item itself to the user.

That functions of the digital resource provisioning platform 202 have been discussed in terms of engines 234 in the memory 204 is given by example and not by way of limitation. Persons having ordinary skill in the art will recognize that any of the engines 234 may operate using any elements (either alone or in combination) of the digital resource provisioning platform 202, including (but not limited to) the memory 204, the processor(s) 206, the network/com interface 208, the I/O interface 210, and the system bus 212. Further, persons having ordinary skill in the art will recognize that the engines 234 may operate using other elements not shown herein (e.g., a custom computer chip with firmware to operate all or part of one or more of the engines 234). Further, it is contemplated that the engines 234 may include additional functionality other than what has been described.

The memory 204 of the digital resource provisioning platform 202 may store data in a static manner. For example, the memory 204 may comprise, e.g., a hard disk capable of storing data even during times when the digital resource provisioning platform 202 is not powered on. This static memory may be beneficial for, e.g., storing a large amount of digital content items (including the digital content items 222-228). The memory 204 may also store data in a dynamic manner. For example, the memory 204 may comprise Random Access Memory (RAM) storage configured to hold engines (including engines 234), and/or configured to store one or more digital content items (including the digital content items 222-228) as they are read from a hard disk.

The I/O interface 210 may comprise any mechanism allowing an operator to interact with and/or provide data to the digital resource provisioning platform 202. For example, the I/O interface 210 may include a keyboard, a mouse, a monitor, and/or a data transfer mechanism, such as a disk drive or a flash memory drive. The I/O interface 210 may allow an operator to place information in the memory 204, or to issue instructions to the digital resource provisioning platform 202 to perform any of the functions described herein.

The one or more processors 206 of the digital resource provisioning platform 202 may perform the functionalities already described herein. In addition, the processors 206 may perform other system control tasks, such as controlling data flows on the system bus 212 between the memory 204, the network/COM interface 208, and the I/O interface 210. The details of these (and other) background operations may be defined in operating system instructions (not shown) upon which the one or more processors 206 operate.

Figure 3:
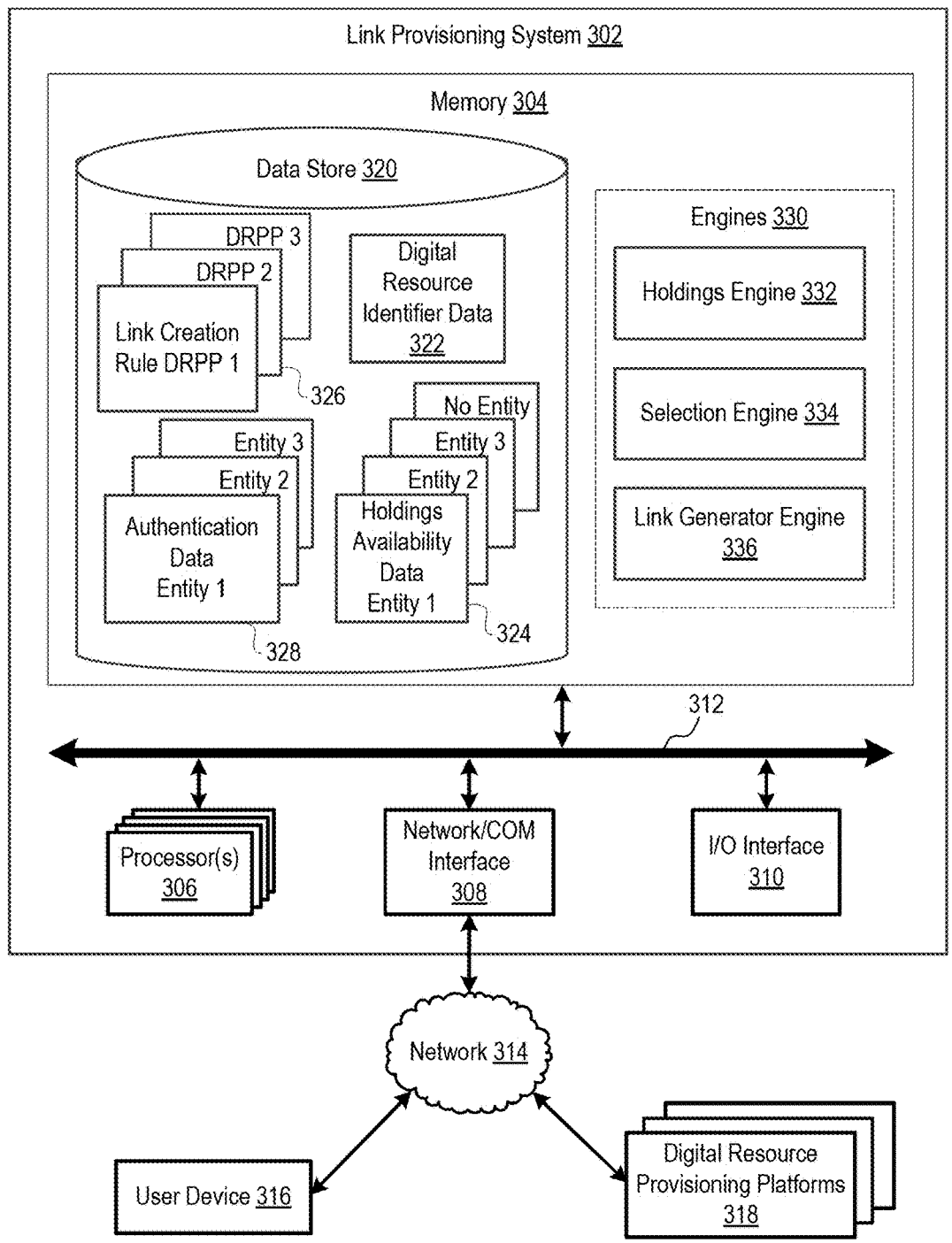
FIG. 3 illustrates a system in accordance with an embodiment of the present disclosure.

FIG. 3 illustrates a system 300 in accordance with an embodiment of the disclosure. FIG. 3 includes a detailed view of a link provisioning system 302. The link provisioning system 302 may be similar to the link provisioning system 128 of FIG. 1.

The link provisioning system 302 may include a memory 304, one or more processors 306, a network/COM interface 308, and an I/O interface 310, which may all communicate with each other using a system bus 312. The network/COM interface 308 of the link provisioning system 302 may be connected to a network 314 and may act as a reception and/or distribution device for computer-readable instructions. This connection may facilitate the transfer of information (e.g., computer-readable instructions) to and from the link provisioning system 302, a user device 316, and one or more digital resource provisioning platforms 318. The user device 316 may be any one of the user devices 110-116 of FIG. 1. The network 314 may be the network 126 of FIG. 1. Any one of the digital resource provisioning platforms 318 may be any one of the digital resource provisioning platforms 138-142 of FIG. 1.

The memory 304 of the link provisioning system 302 may include a data store 320. The data store 320 may hold digital resource identifier data 322. The data store 320 may hold holdings availability data 324. The data store 320 may hold link creation rules 326. The data store 320 may hold authentication data 328.

The digital resource identifier data 322 may associate a known digital resource identifier with one or more other data points relative to the digital resource identifier, such as a content set identifier associated with the identified digital content item. This content set identifier may be, e.g., the International Standard Serial Number (ISSN) or the Electronic International Standard Serial Number (eISSN) of a journal where the identified digital content item is published as an academic article. Other types of content set identifiers, including titles, are contemplated. The resource identifier date 322 may also associate a known digital resource identifier with a publication date of the identified digital content item, or other data relative to the identified digital content item. When a user request containing a digital resource identifier arrives at the link provisioning system 302, the digital resource identifier may therefore be used with the digital resource identifier data 322 to obtain the content set identifier (e.g., a journal ISSN/eISSN in the case of an academic article), publication date, and/or other data relative to the requested digital content item. This information may be useful to the link provisioning system 302 in identifying one or more content sets hosted on a digital resource provisioning platform 318 that are available to the user and contain the requested digital content item, as will be described below.

The holdings availability data 324 may include information relative to multiple entities (e.g., institutions, or individual users, as described above) regarding how users associated with those entities may access one or more content sets (or, alternatively, individual digital content items) hosted on the digital resource provisioning platforms 318 in an authorized manner. The holdings availability data 324 may be indexed, ordered, or otherwise collected according to the entity for which that indexing, ordering, or collection is designed. The holdings availability data 324 relative to a single entity may include listings of content sets and/or individual digital content items that are available to the entity on at least one of the digital resource provisioning platforms 318. A listing for a content set may map the content set to a digital resource provisioning platform 318 upon which the respective content set is available to the user.

The holdings availability data 324 relative to an entity may indicate which digital content items are available to a user associated with that entity on the various digital resource provisioning platforms 318. This availability to the user may be indicated with information regarding the ability of one or more entities associated with the user to access various content sets containing digital content items (or the individual digital content items) hosted on one or more of the digital resource provisioning platforms 318.

For example, an availability to the user may be indicated with information regarding the ability of an institution with which the user is affiliated to access various content sets containing the digital content item (or to access the individual digital content item itself) stored on one or more of the digital resource provisioning platforms 318. In some cases, a listing in the holdings availability data 324 corresponding to an institution with which the user is affiliated may show that the institution has access to a content set containing the digital content item (or an individual digital content item) on a certain one of the digital resource provisioning platforms 318. Because the user is an affiliate of an institution, the holdings availability data 324 therefore acts to indicate that each digital content item in that content set (or, alternatively, the individual digital content item) is available to the user on one of the digital resource provisioning platforms 318. The institution with which the user is affiliated may have access to the various content sets containing the digital content item (or to access the individual digital content item itself) stored on that one of the digital resource provisioning platforms 318 due to a subscription agreement with the operator of that one of the digital resource provisioning platforms 318.

Alternatively, an availability to the user may be indicated with information regarding the ability of the user to access various content sets containing the digital content item (or to access the individual digital content item itself) stored on one or more of the digital resource provisioning platforms 318. For example, a record in the holdings availability data 324 corresponding to the user may show that the user has access to a content set (or an individual digital content item) on one of the digital resource provisioning platforms 318. The user may have access to the content set containing the digital content item (or to access the individual digital content item itself) stored on that one of the digital resource provisioning platforms 318 due to the user's own subscription to that one of the digital resource provisioning platforms 318.

The various content set listings included in the holdings availability data 324 relative to an entity may be indexed in a number of ways such that the link provisioning system 302 may be able to locate a relevant content set listing when needed. For example, a content set listing within the holdings availability data 324 may be indexed using a content set identifier associated with the content set (e.g., the ISSN/eISSN if the content set is an academic journal). A content set listing may further be indexed by start and end publication date data for the digital content items in the corresponding content set. The data points of a single content set listing in the holdings availability data 324 may be broken up into categories (e.g., a content set identifier category, a title category, start date and end date categories corresponding to the start and end publication dates for accessible content set items, and/or a source category). Due to the possibility of different start and end publication dates for accessible content set items in any given content set, it is anticipated that two or more content sets across one or more digital resource provisioning platforms 318 associated with the same content set identifier may actually contain different digital content items. As described below, the link provisioning platform 302 accounts for this aspect when in use.

A received user request may contain a digital resource identifier for a digital content item stored on one or more of the digital resource provisioning platforms 318. The link provisioning system 302 may be able to obtain (e.g., scrape, read, receive) the digital resource identifier from the user request. The link provisioning system 302 may use the provided digital resource identifier in conjunction with the digital resource identifier data 322 in the manner described above in order to determine one or more pieces of information (e.g., a content set identifier associated with a content set containing the digital content item and/or a publication date for the digital content item) that may be used to identify content set listings of interest in the holdings availability data 324.

A received user request may contain an entity identifier. The link provisioning system 302 may be able to obtain (e.g., scrape, read, receive) the entity identifier from the user request. In some embodiments described herein, an entity identifier may be provided to the system after the arrival of the user request. In either case, the link provisioning system 302 may then use the entity identifier to locate the set of holdings availability data 324 that corresponds/relates to the entity.

The link provisioning system 302 may then use the holdings availability data 324 relative to the entity in conjunction with the information (e.g., a content set identifier and publication date) located using the digital resource identifier of the user request with the digital resource identifier data 322 in order to identify one of the digital resource provisioning platforms 318 that can provide the user-requested digital content item to the user. This may be done by, e.g., matching the located content set identifier and publication date to a content set listing within the holdings availability data 324 relative to the entity with that content set identifier and a date range covering the publication date, and identifying, using other data categories for that content set listing (e.g., a source category), the mapping to one of the digital resource provisioning platforms 318 that hosts the indicated content set.

It is contemplated that some user requests may arrive at the link provisioning system 302 without an entity identifier. This may be because the user request may come from a user that is not associated with an entity served by the link provisioning system 302 (e.g., a user that is not affiliated with an institution served by the link provisioning system 302 and that is not personally identified at a user level by the link provisioning system 302 as an entity). For these requests, it may be that the link provisioning system 302 uses a set of holdings availability data that does not list a relative entity associated with that data. This set of holdings availability data may comprise, for example, content set data for content sets that are accessible on the one or more digital resource provisioning platforms 318 that are not access limited to only authorized users and thus are still available to the user despite the user's failure to be associated with an entity of the system 302.

It may instead be the case that a user making a user request is in fact associated with an entity served by the link provisioning system 302, but that this information is not reflected in the user request. This may occur when the method used to generate the user request to the link provisioning system 302 does not account for the user's affiliation with an entity and thus cannot include the relevant entity identifier in the user request. When a user request arrives without an entity identifier, the link provisioning system 302 may be configured to ask the user to identify an entity with which the user is associated. The link provisioning system may then use the methods described herein as they relate to the user-identified entity (e.g., as if the user request had initially arrived with the entity identifier of the indicated entity).

The holdings availability data 324 relative to an entity may be generated by the link provisioning system 302 using one or more holdings reports for that entity provided to the link provisioning system 302 from one or more report providers. A report provider may be, e.g., a third party service used by the entity that tracks information regarding the resources subscribed to or otherwise available to the entity on one or more of the digital resource provisioning platforms 318. This information may then be compiled into one or more reports that can subsequently be provided to the link provisioning system 302 via, e.g., the network 314. It is contemplated that a report provider may, in other cases, be the entity itself. Embodiments where the digital resource provisioning platforms 318 could act as report providers for an entity are also contemplated.

These holdings report(s) may use specific categories of data to describe/define the content sets (or individual digital content items) that are available on one or more of the digital resource provisioning platforms 318 to a selected entity. For example, it may be that the link provisioning system 302 is being operated in relation to the digital resource provisioning platforms 318, which are operated by academic journal publishers and therefore contain one or more digital content items that are academic journal articles. These digital content items may be organized into one or more content sets that include some or all of the digital content items hosted on each respective digital resource provisioning platform 318 that belong to a certain academic journal. In this case, the one or more holdings reports received at the link provisioning system 302 may list the one or more available content sets stored in the digital resource provisioning platforms 318 that are available to an entity in terms of their respective associated ISSN/eISSNs (with the ISSN/eISSN being used as the content set identifier).

In this example, a holdings report may additionally include one or more of the following categories for each content set that is listed in terms of respective ISSN/eISSN: the title of the journal, the source of the journal (e.g., the identity of a digital resource provisioning platform 318 which is hosting the content set and for which the content set is available to an entity), a start date and an end date representing the period for which articles published in the journal are included in the content set, and other embargo information detailing which articles of the journal have not been included in the content set (e.g., embargo information detailing that articles in the journal that are less than one year old have been excluded from the content set).

Before the one or more holdings reports for an entity can be used by the link provisioning system 302 to generate a set of holdings availability data 324 relative to that entity, the holdings reports may need to be normalized. This normalization may be necessary because of a lack of an agreed-upon file format and/or nomenclature standard used by the report providers, meaning that a first holdings report received from one report provider may not be in the same file format and/or nomenclature as a second holdings report received from a second report provider. For example, a first holdings report from a first report provider may be in an Extensible Markup Language (XML) format, but a second holdings report from a second report provider may be in a comma separated value (CSV) format. It may also be necessary because, as between two different holdings reports from two different report providers, nomenclature (e.g., data categorization scheme) for the data contained in the various holdings reports may be different (even in cases where a same/similar file format is used). These differing nomenclatures may have different (and potentially overlapping, but not identical) sets of categories represented therein, different terminology conventions used to delineate the categories represented therein (e.g., a category called "source" and a category called "provider" that in reality delineate the same idea), and/or different formats for the individual values represented therein (e.g., the first holdings report may store a date as MM-DD-YYYY and the second holdings report may store a date as DD-MM-YY). For example, a first holdings report may be received in an Alma nomenclature (which uses one data categorization scheme), and a second holdings report may be received in a Serial Solutions nomenclature (which uses a second, different data categorization scheme). Other nomenclatures, including SFX and EBSCO, are possible.

As part of the normalization process, the link provisioning system 302 may cause the data relative to each content set from the one or more holdings reports to be gathered into one location on the link provisioning system 302. It may further cause this gathered data to be in a single file format that uses one consistent arrangement of categories for the data of interest (for example, the chosen file format may be a CSV format, with the first category of each line being content set identifier information (e.g., the ISSN/eISSN of an academic journal), the second category being title information (e.g., the title of an academic journal), the third category being start date information, the fourth category being end date information, and the fifth category being source information, etc.). Further, it may cause the values of interest in a category to be in the same data format (e.g., all dates may be changed to the YYYY-MM-DD International Organization for Standardization (ISO) standard format).

It may be that the link provisioning system 302 is aware of the file and data formats used in a received holdings report by a particular report provider. In these cases, the link provisioning system 302 may perform the normalization operations described above on the data contained in a holdings report from that particular report provider in an automated fashion. This automated normalization may mean that an operator of the link provisioning system 302 is not required to manually normalize the data in a received holdings report from that report provider.

In other cases, it may be that the link provisioning system 302 may not be aware of the file and/or data formats used in a received holdings report by a particular report provider. In these cases, it may not be possible for the link provisioning system 302 to use an automated normalization process on the report right away. In these cases, an operator of the link provisioning system 302 may "teach" the link provisioning system 302 how to automate a normalization process for the unfamiliar holdings report. This teaching process may create the necessary instructions in the link provisioning system 302 to enable it to automate the normalization process for the report. Further, in some cases, this single teaching process may allow the link provisioning system 302 to automate the normalization of future reports from the same report provider with no manual operator intervention.

The link provisioning system 302 may perform an identification operation on each of the content sets communicated by the one or more received holdings reports in order to determine which of the digital resource provisioning platforms 318 contains the content set. This may occur before or after all of the content set data has been gathered into one place and normalized as above. This identification may use a source category included in content set data indicated in a holdings report (or in the content set data that has already been collected and normalized) to determine which of the digital resource provisioning platforms 318 is indicated by the particular piece of content set data.

Due to a lack of standards for holdings reports between different report providers, it may be that different holdings reports from different report providers use different names to refer to the same one of the digital resource provisioning platforms 318. Because of this, it may be necessary for an operator of the link provisioning system 302 to map each of these different possible names to each other and indicate to the link provisioning system 302 that it should understand each of these names to indicate the same one of the digital resource provisioning platforms 318 during the processes herein.

The link provisioning system 302 may then generate the holdings availability data 324 relative to the entity for which the holdings report(s) have been received, collected, normalized, and for which content sets within the holdings report(s) have been identified, as described above. This may be accomplished by listing one or more of the identified content sets in the holdings availability data 324 relative to the entity. Each content set listing may map to the digital resource provisioning platform 318 where the corresponding content set may be located. This mapping may be accomplished by including or appending source data corresponding to the digital resource provisioning platform 318 where the content set may be located to the content set listing. This source data creating the mapping may be present in the content set listing because it was present as part of a source category in the holdings report used to generate the content set listing.

A content set represented in the collected data that has no overlap with another content set represented in the collected data (e.g., an academic journal content set for which an ISSN/eISSN of a journal is unique, or for which the ISSN/eISSN is not unique but there is no overlap in range relative to the start date and the end date between multiple academic journal content sets with the same journal ISSN/eISSN) may be added to the holdings availability data 324 relative to the entity immediately. However, it is possible that there is an overlap between some of the content sets represented in the collected data. For example a first content set represented in the collected data may indicate the same content set identifier as a second content set represented in the collected data, and the first content set may indicate a date range that overlaps with a date range indicated by the second content set. This can occur when, e.g., a content set is available for different covered date ranges to users associated with the entity on different digital resource provisioning platforms 318. The decision regarding which content set from which digital resource provisioning platform 318 should be included in the holdings availability data 324 relative to the entity in cases such as these may be determined using a ranking process.

This ranking process used by the link provisioning system 302 may use one or more of the categories represented in the collected, normalized, and identified data in order to determine primacy between two or more overlapping content sets represented in the collected data. For example, the ranking process may use the source data to determine primacy. In some cases, source data may indicate that one content set is hosted on a digital resource provisioning platform 318 operated by a direct publisher of the requested digital content item. As between content sets that indicate that the entirety of a journal is available as part of the content set, the content set hosted on the publisher's digital resource provisioning platform 318 may be selected for listing in the holdings availability data 324 relative to the entity. This may be because the direct publisher may be known to update the content set more expeditiously or otherwise do a better job of maintaining its content sets than other platforms. An operator of the link provisioning system 302 may have indicated this thinking by pre-indicating a relative ranking between the digital resource provisioning platforms 318 hosting the content sets in question, where the relative ranking was based on the knowledge that one of the digital resource provisioning platforms 318 was operated by a direct content publisher and the other digital resource provisioning platforms 318 were operated instead by content aggregators.

Further, ranking based on source data may also be based on statistics gathered over time about the source through the use of the link provisioning system 302. For example, a content set from a source that is known more reliably work with the link provisioning system 302 may be given primacy above a content set from a source that is known to less reliably work with the link provisioning system 302.

In another example, the ranking process may use the start date data and/or the end date data to determine primacy between overlapping content sets. In some cases, two or more content sets represented in the collected data may include academic articles from the same academic journal. These content sets may have the same start date but have different end dates. It may be that, all other things being equal, the link provisioning system 302 is configured to select the content set with the later end date (i.e., the content set with more coverage in time) for listing in the holdings availability data 324 relative to the entity, rather than the content set with the earlier end date (i.e., the content set with less coverage in time). In other cases, the content sets may instead have the same end dates but have different start dates. It may be that, all other things being equal, the link provisioning system 302 is configured to select the content set with the earlier start date for listing in the holdings availability data 324 relative to the entity, rather than the content set with the earlier end date. This may be out of recognition that the demand for content is higher the more current that it is.

In another example, the ranking process may use embargo data to determine primacy between overlapping content sets. In some cases, two or more content sets represented in the collected data may include academic articles from the same journal. These content sets may have the same start date and end date. However, it may be that all but one of these content sets is further indicated to be affected by an embargo of some period of time. With all other things being equal, the link provisioning system 302 may be configured to select the content set without the embargo for listing in the holdings availability data 324 relative to the entity.

In the case of only a partial overlap between two content sets represented in the collected, normalized, and identified data, where each content set has at least some digital content items that are not found in the other content set, it may be that the ranking process as described above is used to select which of the content sets will be listed in an unadjusted form in the holdings availability data 324 relative to the entity. It may then be that the unselected content set is adjusted in some way to resolve the unnecessary overlap (e.g., its coverage start date and/or end date adjusted such that only the digital content items unique to the unselected coverage set are indicated). This adjusted content set may then also be listed in the holdings availability data 324 relative to the entity.

Other processes for ranking overlapping content sets using other items from the collected, normalized, and identified data will be apparent to persons having ordinary skill in the art. While the above ranking methods have been described as individual processes, the link provisioning system 302 may be configured to use any number of those processes together in order to select the content sets that will be reflected in the holdings availability data 324 relative to the entity for which the original holdings report(s) were provided.

In the holdings availability data 324 relative to the entity, the listing of only one of the digital resource provisioning platforms 318 as the provider for a content set (or individual digital content item) to that entity may recognize that, in most cases, a copy of a digital content item hosted on one of the digital resource provisioning platforms 318 is substantially equivalent (as far as a user is concerned) to any other copy of the digital content item hosted on any other of the digital resource provisioning platforms 318. Further, the indication that only one of the multiple digital resource provisioning platforms 318 can be used as a provider for a content set of digital content items (or an individual digital content item) may reduce the complexity of the holdings availability data 324 and therefore the complexity of the systems/engines that operate on that data. For example, the link provisioning system 302 operating on the holdings availability data 324 relative to an entity may not have to choose between two or more digital resource provisioning platforms 318 capable of providing a requested digital content item to a requesting user associated with that entity, simply because there is only one available content set listed in the holdings availability data 324 relative to the entity.

As stated above, it is contemplated that there may be some content sets hosted on one or more of the digital resource provisioning platforms 318 for which having authorization is not required before being granted access. Information regarding these content sets may also arrive at the link provisioning system 302 in one or more holdings reports, or may be known to the link provisioning system 302 by another method. When using the methods described above to generate holdings availability data 324 relative to an entity, the link provisioning system 302 may collect, normalize, identify, and rank this data along with the rest. Additionally, the link provisioning system 302 may collect, normalize, identify, and rank this group of data into a set of holdings availability data 324 that is not relative to any entity. This set of holdings availability data 324 may be used with processes described herein with user requests not containing an entity identifier (or for which the given entity identifier is not useful and/or invalid).

The link creation rules 326 may contain information regarding the manner of constructing a direct link to a digital content item hosted on one or more of the digital resource provisioning platforms 318. Individual link creation rules within the link creation rules 326 may individually each correspond to one of the digital resource provisioning platforms 318. These link creation rules 326 may be entered into the link provisioning system 302 by, e.g., an operator of the link provisioning system 302. The use by the link provisioning system 302 of a given link creation rule 326 may therefore allow the link provisioning system 302 to create a direct link for a specific digital content item on a specific digital resource provisioning platform 318 from among the digital resource provisioning platforms 318. This specific digital resource provisioning platform 318 may have previously been selected to provide the digital content item by the link provisioning system 302 after receiving a digital resource identifier in a user request and comparing that digital resource identifier to the holdings availability data 324, as described above.

In some cases, it may be possible to determine that the direct link to any given digital content item on a certain digital resource provisioning platform 318 may follow a pattern expressed by a link template containing one or more variable fields, where only the one or more variable fields represented in the link template are changed as between a pair of valid direct links respectively leading to different digital content items on the digital resource provisioning platform 318. This determination may be made by, e.g., an operator of the link provisioning system 302. The link creation rule 326 for the certain digital resource provisioning platform 318 may therefore include this link template along with instructions to the link provisioning system 302 for how to fill the variable fields in order to generate the direct link to a specific digital content item on the certain digital resource provisioning platform 318.

For example, a link creation rule 326 for a digital resource provisioning platform 318 may indicate that one or more of the variable field(s) of the link template of that link creation rule 326 should be filled with information corresponding to the digital content item. For example, the link creation rule 326 for a digital resource provisioning platform 318 may indicate that the digital resource identifier (e.g., a DOI of an academic article) should be incorporated into one or more of the variable field(s). The link creation rule 326 may also indicate (either alternatively or additionally) that other information corresponding to the digital content item should be filled into one or more of the fields, such as a content set identifier associated with the digital content item.

As another example, a link creation rule 326 for a digital resource provisioning platform 318 may indicate that one or more of the variable field(s) of the link template of the link creation rule 326 should be filled with information corresponding to the authentication of the user to the digital resource provisioning platform associated with the link. For example, the link creation rule 326 for the digital resource provisioning platform 318 may indicate that a username and/or a password be inserted into the link.

Further, a link creation rule 326 for a digital resource provisioning platform 318 may indicate that one or more of the variable fields(s) of the link template of the link creation rule should be filled with information not inherently related to a property of the requested digital content item, but rather information that is related to the digital resource provisioning platform 318 itself. For example, it may be determined by an operator of the link provisioning system 302 that the digital resource provisioning platform 318 associated with the link creation rule 326 uses a system-wide variable text pattern inserted into the direct links corresponding to hosted digital content items. To the extent that this variable text pattern can be ascertained by the operator, the operator may instruct the link provisioning system 302 regarding the manner of ascertaining this variable text pattern and then configure the rule to indicate that this calculated pattern should be inserted into one or more variable field(s) of the link.

There may be cases where the direct links to the digital content items on a given digital resource provisioning platform 318 may not be predicable. This may be because the direct links do not follow any discernable pattern that can be expressed as a link template with variable fields, and/or because the direct links corresponding to the digital content items on the digital resource provisioning platform 318 change over time in unpredictable ways. In these cases, the link creation rule 326 for that digital resource provisioning platform 318 may simply comprise a listing of full (functional) links for each digital content item on that digital resource provisioning platform 318. In some cases, each of these full links acts as a direct link to a digital content item on the digital resource provisioning platform 318. This listing of full links may be useful in cases where non-predictable direct links used by the digital resource provisioning platform 318 are not changed over time. However, this method may require an operator of the link provisioning system 302 to discover the non-predictable direct link for a given digital content item on the digital resource provisioning platform 318 and then include the direct link in the link creation rules 326 associated with that digital resource provisioning platform 318.

In other cases where the digital resource provisioning platform 318 uses non-predictable direct links, the link creation rule 326 for that digital resource provisioning platform 318 may simply comprise a listing of full (functional) links that are instead associated with the article abstract pages on the digital resource provisioning platform 318 for each hosted digital content item. This may be useful in cases where the non-predictable direct link to the digital content item may change over time (with the change making the previous direct link non-functional). However, this link's eventual use by the user will result in the user's arrival on the article abstract page (rather than directly at the digital content item). It is worth noting that a link provisioning system 302 using this method may still save the user the need to manually select between multiple available digital resource provisioning platforms 318 (and the corresponding downsides of doing so, described above). If the link to the article abstract page is also non-predictable (but static over time), this method may require an operator of the link provisioning system 302 to manually discover the non-predictable article abstract page link and then manually include the article abstract page link in the link creation rules 326 associated with the digital resource provisioning platform 318.

The authentication data 328 may include information regarding various entities (e.g., institutions, or individual users, as described above) that is useable by the link provisioning system 302 to help a user associated with an entity to access the content on one or more of the digital resource provisioning platforms 318 in an authorized fashion. Similar to the holdings availability data 324, the authentication data 328 may include information relative to multiple entities (e.g., institutions, or individual users, as described above). The authentication data 328 may be indexed, ordered, or otherwise collected according to the entity for which that indexing, ordering, or collection of authentication data 328 is designed to work.

A user request received at the link provisioning system 302 may include an entity identifier for an entity associated with the user (e.g., an institution identifier for an institution with which the user is affiliated, or a user identifier unique to the user). The user may be authenticated to one of the digital resource provisioning platforms 318 when the link provisioning system 302 uses some of the authentication data 328 relative to the identified entity in conjunction with (or along with) with a generated direct link to a digital content item on one of the digital resource provisioning platforms 318, thereby giving the user making the request authorized access to that digital content item on the digital resource provisioning platform 318.

For example, a user request for a digital content item received at the link provisioning system 302 may include, as an entity identifier, an institution identifier for an institution with which the user making the request is affiliated. The user may be able to send a request with the institution identifier (thereby indicating to the link provisioning system 302 that the user is affiliated with the institution identified) by nature of being actually or virtually connected to the network of the institution, or by first authenticating with a computer system of the institution. Details of these processes were described above relative to FIG. 1. Alternatively, the user may have manually indicated an institution with which the user is affiliated, as described above. The link provisioning system 302 may then use the portion of the authentication data 328 that is related to that institution to take appropriate steps such that the user will be recognized as affiliated with the institution (and therefore authorized) by the one or more digital resource provisioning platforms 318 hosting the linked-to digital content items when the user activates the link.

Alternatively, a user request for a digital content item received at the link provisioning system 302 may include, as an entity identifier, a user identifier for the user. The link provisioning system 302 may then use the portion of the authentication data 328 that is related to that user to take appropriate steps such that the user will be recognized as authorized by the one or more digital resource provisioning platforms 318 hosting the linked-to digital content item when the user activates the link.

The authentication data 328 relative to an entity may include linking information that should be used with or added to a direct link generated by the use of the link creation rules 326 in order to cause the use of the link itself to authorize a user to access a digital resource provisioning platform 318. For example, the authentication data 328 relative to an entity that uses a proxy server to authenticate with a digital resource provisioning platform 318 may include a link wrapper into which an original direct link generated by the link provisioning system 302 using the link creation rules 326 should be placed. The placement of the original direct link in the link wrapper may cause the newly created combined direct link to first arrive at the proxy server of the entity, and then be activated by that proxy server, with the proxy server automatically returning any data back to the user. In the context of this disclosure, this combination of the original direct link into a link wrapper may itself be considered a direct link, in that the user can then simply click on or otherwise activate this combined link with the result of being directly presented with the digital content item. In some embodiments, it may be necessary to first remove some portion of the original direct link (e.g., a leading "http://" or "https://") before inserting the original direct link into the link wrapper. It may further be necessary to modify the original direct link before incorporating it into the link wrapper to account for the proper translation of the text of the original direct link across multiple machines that each translate (and potentially modify according to a protocol such as HTTP) a portion of the link.

As another example of linking information, the authentication data 328 relative to an entity may using linking information that indicates the username and password associated with that entity that should be included in the variable fields of a link template of a link creation rule 326 for a digital resource provisioning platform 318 that requires the insertion of one or more of a username and password into the link template in order for the direct link to function. In these cases, the authentication data 328 relative to the entity may be the source of the username and password added to the link template in methods described above.

The authentication data 328 relative to an entity may include checking information necessary for the link provisioning system 302 to be capable of checking whether a direct link provided to a user in response to a user request will be successful. This checking information may be used instead of, or in addition to, the linking information described above.

The checking information may include, e.g., one or more specified IP addresses from which a request by a user associated with an entity must be transmitted in order for a given digital resource provisioning platform 318 to recognize the request as being sourced from a network of the entity (and therefore from an authorized user). The link provisioning system 302 may be capable of warning a user making a user request that contains an identifier for such an entity from an IP address that is not specified in this checking information that the user's IP address is not one of the IP addresses specified in the checking information. This may allow the user the chance to, e.g., turn on a VPN (thereby obtaining a specified IP address) before attempting to activate a provided direct link.

The checking information may include, e.g., details regarding an authenticated software session that is expected by a given digital resource provisioning platform 318 relative to an entity, and that should be active on a user device 316 in order for the user to be authenticated to a given digital resource provisioning platform 318. The link provisioning system 302 may be capable of determining whether the session is active and warning a user who is associated with the entity and making a user request to the given digital resource provisioning platform 318 that the necessary session is not active on the user's device.

Once a direct link is generated and any associated linking authentication and/or checking authentication relative to the entity corresponding to the user making the user request is completed, the direct link may be provided to the user. This may occur in various ways. For example, a forwarding link from the link provisioning system 302 may be presented to the user. When the user operates the forwarding link, the link provisioning platform 302 may, in response, automatically cause the user device 316 to follow the generated direct link, which in turn directly leads to the requested digital content item on a selected digital resource provisioning platform 318. In the context of this disclosure, the user's activation of the forwarding link acts to provide the direct link to the user device 316. Alternatively, the direct link (perhaps modified with, e.g., a link wrapper for a proxy server) may itself be presented to the user on the user device 316, thereby providing the link to the user.

It may be that as a result of some of the use cases described above, the link provisioning system 302 generates and provides a direct link to a user where an entity identifier was used to generate the link, but where the user has not yet been authenticated as a legitimate user of that entity's resources. In these cases, once the provided direct link is activated, it may still be necessary for the user to authenticate as a legitimate user of that entity's resources. For example, it may be that the user manually indicated to the link provisioning system 302 that it was affiliated with an institution, and received accordingly a direct link with a link wrapper for a proxy server for that institution, before authenticating the user session with a computer system of the institution. In such a case, when the direct link arrives at the proxy server of the institution (via operation of the link wrapper), the user may be prompted to authenticate with the proxy server before the direct link operates to provide the requested digital content item.

In addition to the data store 320, the memory 304 of the link provisioning system 302 may further include engines 330. These engines 330 may include a selection engine 334, a link generator engine 336, and a holdings engine 332. Certain operations that may be performed by each of these engines will be described below.

A holdings engine 332 of the link provisioning system 302 may operate in the following way: The holdings 332 engine may request (or otherwise be provided) one or more holdings reports associated with an entity from one or more report providers. The holdings engine 332 may then use the data in these holdings report(s) to generate the holdings availability data 324 relative to the indicated entity using the methods described herein, with the holdings availability data 324 relative to the given entity having the characteristics described herein.

A selection 334 engine of the link provisioning system 302 may operate in the following way: The selection engine 334 may receive a user request over the network 314. The user request may contain a digital resource identifier for a digital content item stored on one or more of the digital resource provisioning platforms 318. The user request may also contain an entity identifier for an entity associated with the user. The selection engine 334 of the link provisioning system 302 may be able to obtain (e.g., scrape, read, receive) the digital resource identifier and/or the entity identifier from the user request. The selection engine 334 may then be able to use the entity identifier to locate holdings availability data corresponding to the entity. The selection engine 334 may then be able to use the digital resource identifier, or alternatively one or more pieces of information received from the use of the digital resource identifier with the digital resource identifier data 322, in conjunction with the located holdings availability data 324 corresponding to the entity to select a digital resource provisioning platform 318 for which the located holdings availability data 324 has indicated that requested digital content item is available to the user.

A link generator engine 336 of the link provisioning system 302 may operate to generate a direct link to a digital content item. The link generator engine 336 may be instructed by the link provisioning system 302 to generate a link to a certain digital content item on one of the digital resource provisioning platforms 318. The digital resource provisioning platform may have been previously selected by the link provisioning system 302 (e.g., through the use of a selection engine in the manner described above). The link generator engine 336 may generate a direct link to the digital resource on the digital resource provisioning platform 318 using the link creation rules 326 for that digital resource provisioning platform 318 in the manner previously discussed. If necessary, the link generator engine 336 may use (or include) authentication data 328 relative to an identified entity with (or into) a direct link generated by the link generator engine 336, in the manner already described. The direct link generated by the link generator engine 336 may then be provided to a user over the network 314.

That functions of the link provisioning system 302 have been discussed in terms of engines 330 in the memory 304 is given by example and not by way of limitation. Persons having ordinary skill in the art will recognize that any of the engines 330 may operate using any elements (either alone or in combination) of the link provisioning system 302, including (but not limited to) the memory 304, the processor(s) 306, the network/com interface 308, the I/O interface 310, and the system bus 312. Further, persons having ordinary skill in the art will recognize that the engines 330 may operate using other elements not shown herein (e.g., a custom computer chip with firmware to operate all or part of one or more of the engines 330). Further, it is contemplated that the engines 330 may include additional functionality other than what has been described.

The memory 304 of the link provisioning system 302 may store data in a static manner. For example, the memory 304 may comprise a hard disk capable of storing data even during times when the link provisioning system 302 is not powered on. This static memory may be beneficial for, e.g., storing a large amount of holdings availability data (including holdings availability data 324). The memory 304 may also store data in a dynamic manner. For example, the memory 304 may comprise, e.g., RAM storage configured to hold engines (including engines 330), and/or configured to store a direct link that has been generated by the link provisioning system 302.

The I/O interface 310 may include any mechanism allowing an operator to interact with and/or provide data to the link provisioning system 302. For example, the I/O interface 310 may include a keyboard, a mouse, a monitor, and/or a data transfer mechanism, such as a disk drive or a flash memory drive. The I/O interface 310 may allow an operator to place information in the memory 304, or to issue instructions to the link provisioning system 302 to perform any of the functions described herein.

The one or more processors 306 of the link provisioning system 302 may perform the functionalities already described herein. In addition, the processors 306 may perform other system control tasks, such as controlling data flows on the system bus 312 between the memory 304, the network/COM interface 308, and the I/O interface 310. The details of these (and other) background operations may be defined in operating system instructions (not shown) upon which the one or more processors 306 operate.

Figure 4:
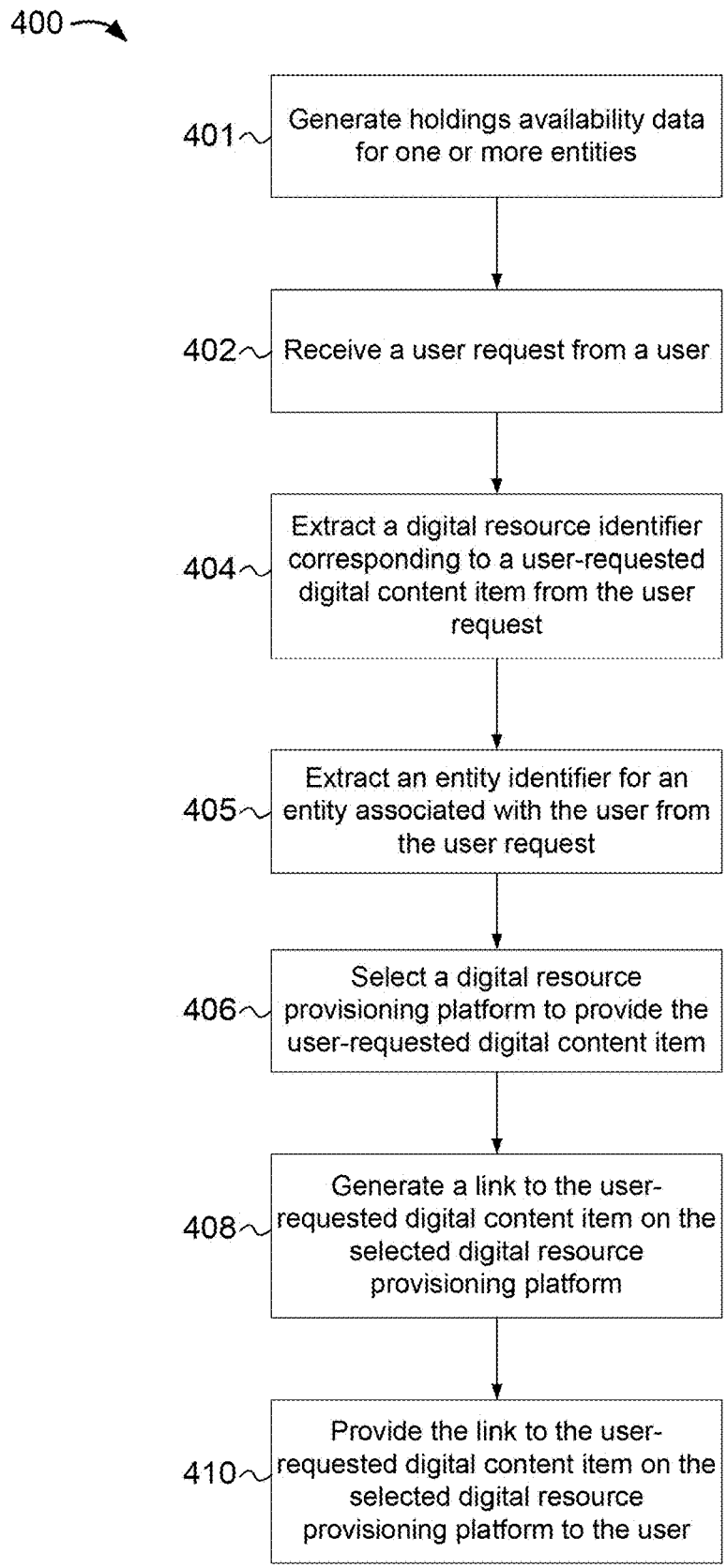
FIG. 4 illustrates a method of a link provisioning system, according to an embodiment.

FIG. 4 illustrates a method 400 of a link provisioning system, according to an embodiment of the present disclosure. The method 400 includes generating 401 holdings availability data for one or more entities. Entities for which holdings availability data may be generated may be institutions or individual users, and may be generated in the manner described above.

The method 400 further includes receiving 402 a user request from a user. The user request may be generated by a user using a user device. A user request may contain a digital resource identifier (e.g., a DOI for an academic article). In some cases, a user request may also include an entity identifier. The entity identifier may identify an entity associated with the user making the user request (e.g., an institution identifier for an institution with which the user is affiliated, or a user identifier unique to the user).

The method 400 further includes extracting 404 a digital resource identifier corresponding to a user-requested resource from the user request. The digital resource identifier may uniquely identify the particular digital resource in which the user is interested.

The method 400 further includes extracting 405 an entity identifier for an entity associated with the user from the user request. The entity identifier may identify an institution or an individual user.

The method 400 further includes selecting 406 a digital resource provisioning platform to provide the user-requested digital resource. The selection 406 of the digital resource provisioning platform may be according to a set of holdings availability data for an entity identified in the user request.

The method 400 further includes generating 408 a link to the user-requested digital resource on the selected digital resource provisioning platform. The link generated 408 may be a direct link that, when activated by the user, causes the user to be directly presented with the item of digital content. This direct link may be a combined direct link, where an original direct link has been placed into a link wrapper to generate a direct link useable with a proxy server, as described above.

The method 400 further includes providing 410 the link to the user-requested digital content item on the selected digital resource provisioning platform to the user. This link may be provided 410 to the user as a clickable link on a web page displayed on a user device. Alternatively, the user device may instead be configured to automatically activate the link once it is provided to the user device.

Figure 5:
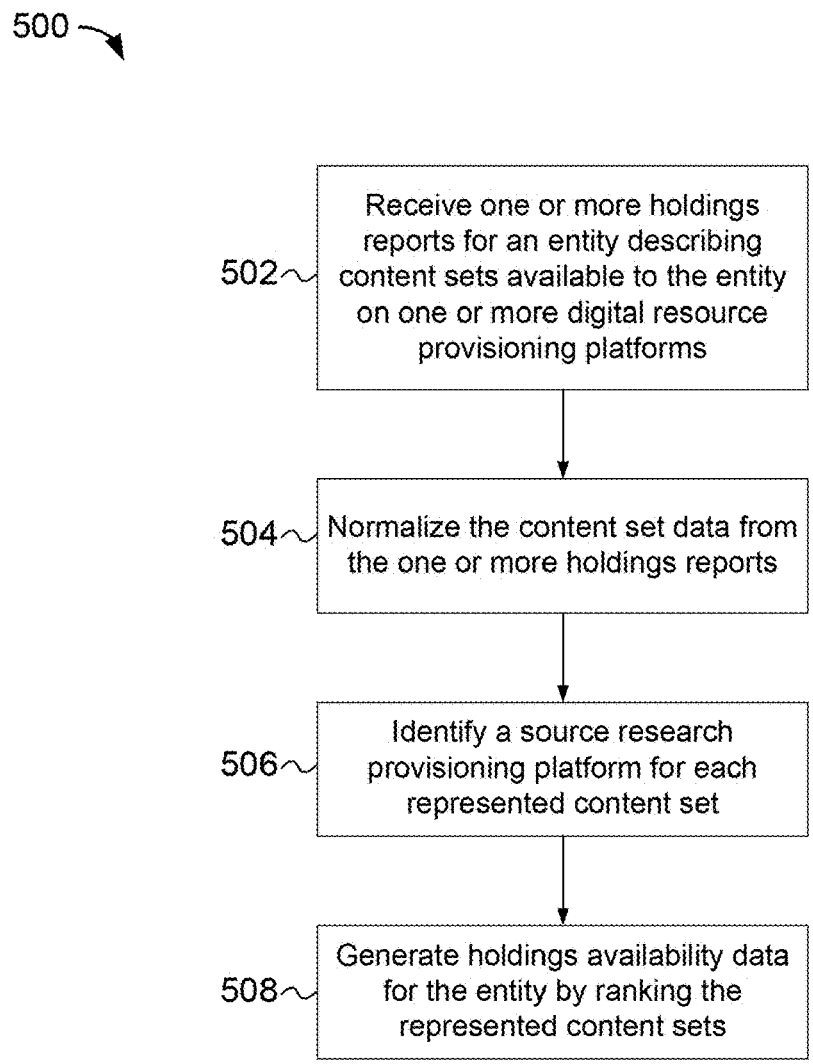
FIG. 5 illustrates a method of a link provisioning system to generate holdings availability data, according to an embodiment.

FIG. 5 illustrates a method 500 of a link provisioning system to generate holdings availability data, according to an embodiment. The method 500 may be used by, e.g., a holdings engine of the link provisioning system.

The method 500 includes receiving 502 one or more holdings reports for an entity describing content sets available to the entity on one or more digital resource provisioning platforms. These holdings report(s) may describe the content sets that are available to the entity on one or more digital resource provisioning platforms using terms of data about those content sets, in the manner described herein.

The method 500 includes normalizing 504 the content set data from the one or more. The content set data from the one or more holdings reports may first be collected into a single location in memory. The collected content set data may then be normalized as to file format and/or data format, using methods described herein.

The method 500 includes identifying 506 a source research provisioning platform for each represented content set. This identification may use a source category included with the normalized content set data, or un-normalized source data from the holdings report(s) themselves (e.g., in cases whether the identifying 506 occurs before the normalizing 504).

The method 500 includes generating 508 holdings availability data for the entity by ranking the represented content sets. The ranking system used may make determinations based on source data, start date data and/or end date data, embargo data, or other data, as discussed herein. A represented content set that is ranked above the other represented content sets with which it overlaps may be listed in the holdings availability data for the entity.

Figure 6:
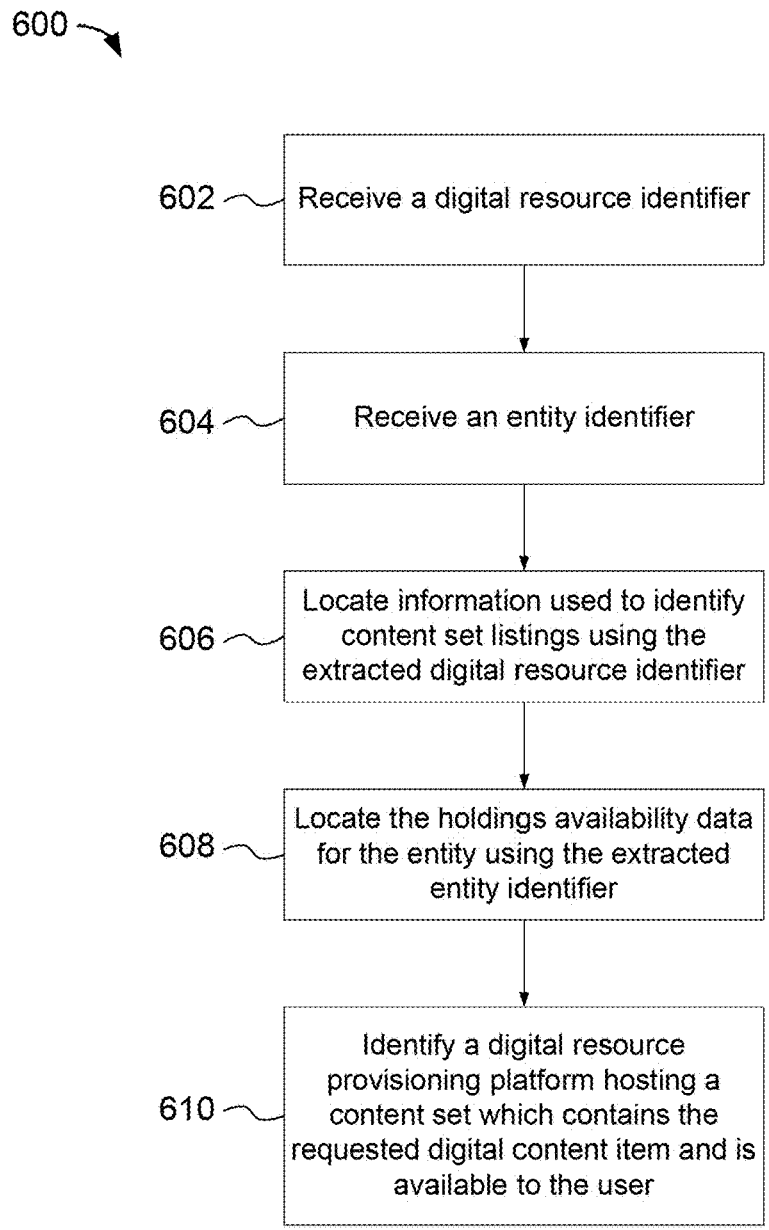
FIG. 6 illustrates a method of a link provisioning system to select a digital resource provisioning platform to provide a requested digital resource, according to an embodiment.

FIG. 6 illustrates a method 600 of a link provisioning system to select a digital resource provisioning platform to provide a requested digital content item, according to an embodiment. The method 600 may be used by, e.g., a selection engine of the link provisioning system.

The method 600 includes receiving 602 a digital resource identifier. This digital resource identifier may be, e.g., a DOI of an academic article. This digital resource identifier may have been obtained (e.g., scraped, read, received) from a user request by the link provisioning system.

The method 600 includes receiving 604 an entity identifier. This entity identifier may be an institution identifier or a user identifier. This entity identifier may identify, e.g., a user that has made the request, or an institution (e.g., a library) with which the user making the user request is affiliated. This entity identifier may have been obtained (e.g., scraped, read, received) from a user request by the link provisioning system.

The method 600 includes locating 606 information used to identify content set listings using the extracted digital resource identifier. The digital resource identifier may be used with digital resource identifier data stored on a link provisioning system to locate 606 a piece of information, such as an ISSN/eISSN of an academic journal, associated with the digital content item identified by the digital resource identifier. The piece of information (e.g., journal ISSN/eISSN) may then be used to identify content set data of interest in a set of holdings availability data.

The method 600 includes locating 608 the holdings availability data for the entity using the extracted entity identifier. This location 608 may be according to an indexing, ordering, or collecting of the holdings availability data that facilitates the location 608 of the holdings availability data for the entity according to the entity identifier.

The method 600 includes identifying 610 a digital resource provisioning platform hosting a content set which contains the requested digital content item and is available to the user. The information used to identify a content set of interest in a set of holdings availability data may be compared to the content set data that exists in the located holdings availability data, and when a match is found, the digital resource provisioning platform hosting the content set corresponding to the matched content set data may be identified using, e.g., the data from a source category within the matched content set data.

Figure 7:
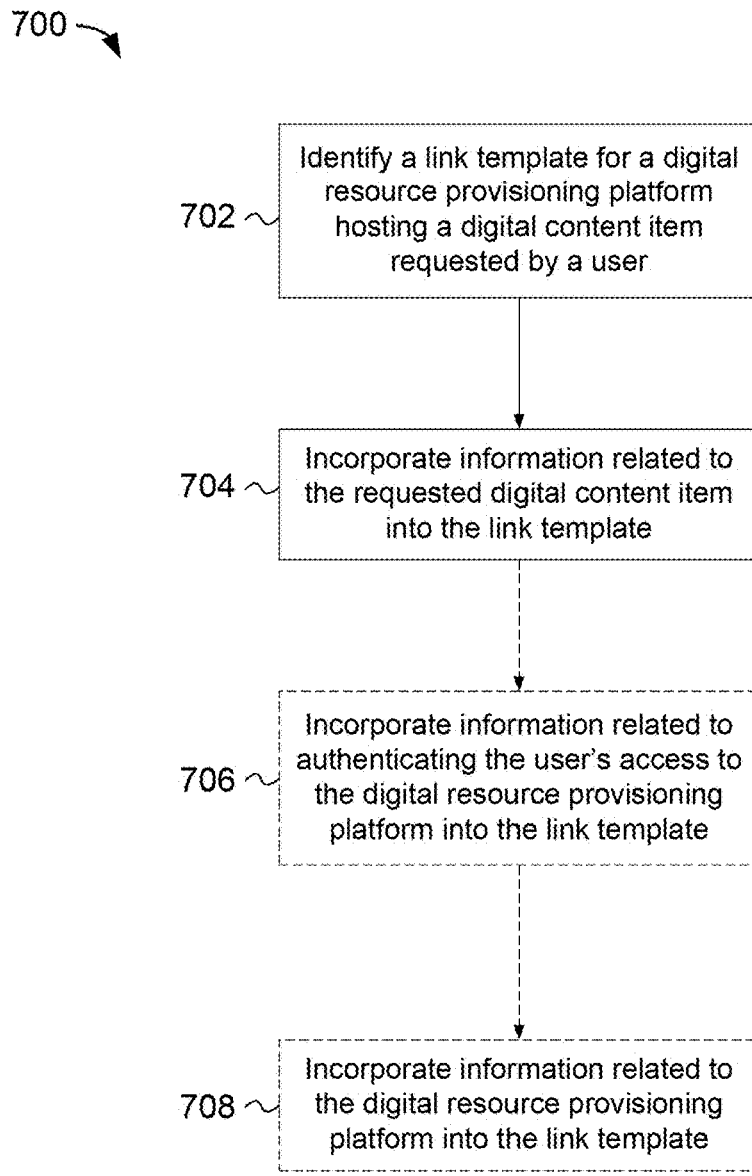
FIG. 7 illustrates a method of a link provisioning system to generate a direct link to a digital resource on a digital resource provisioning platform, according to an embodiment.

FIG. 7 illustrates a method 700 of a link provisioning system to generate a direct link to a digital content item on a digital resource provisioning platform, according to an embodiment. The method 700 may be used by, e.g., a link generator engine of the link provisioning system.

The method 700 includes identifying 702 a link template for a digital resource provisioning platform hosting a digital content item requested by a user. An individual link template may correspond to a single digital resource provisioning platform. This link template may include variable fields. A link provisioning system may possess instructions for how to fill the variable fields of the link template.

The method 700 includes incorporating 704 information related to the requested digital content item into the link template. The link provisioning system may fill the link template with, e.g., the DOI of a requested journal article, and/or an ISSN/eISSN of a journal wherein the requested journal article was published.

The method 700 optionally includes incorporating 706 information related to authenticating the user's access to the digital resource provisioning platform into the link template. For example, a username and/or password for the digital resource provisioning platform may be filled into the link template.

The method 700 optionally includes incorporating 708 information related to the digital resource provisioning platform into the link template. The information to be incorporated 708 may be, e.g., a system-wide variable text pattern used by the digital resource provisioning platform. A link provisioning platform may be capable of determining the variable text pattern at the time the direct link is being created.

The foregoing specification has been described with reference to various embodiments, including the best mode. However, those skilled in the art appreciate that various modifications and changes can be made without departing from the scope of the present disclosure and the underlying principles of the invention. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Embodiments herein may include various engines, which may be embodied in machine-executable instructions to be executed by a general-purpose or special-purpose computer (or other electronic device). Alternatively, the engine functionality may be performed by hardware components that include specific logic for performing the function(s) of the engines, or by a combination of hardware, software, and/or firmware.

Principles of the present disclosure may be reflected in a computer program product on a tangible computer-readable storage medium having stored instructions thereon that may be used to program a computer (or other electronic device) to perform processes described herein. Any suitable computer-readable storage medium may be utilized, including magnetic storage devices (hard disks, floppy disks, and the like), optical storage devices (CD-ROMs, DVDs, Blu-Ray discs, and the like), flash memory, and/or other types of medium/machine readable medium suitable for storing electronic instructions. These instructions may be loaded onto a general purpose computer, special purpose computer, or other programmable data processing apparatus to produce a machine, such that the instructions that execute on the computer or other programmable data processing apparatus create means for implementing the functions specified. These instructions may also be stored in a computer-readable memory that can direct a computer or other programmable data processing apparatus to function in a particular manner, such that the instructions stored in the computer-readable memory produce an article of manufacture including instruction means which implement the function specified. The instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified.

Principles of the present disclosure may be reflected in a computer program implemented as one or more software modules or components. As used herein, a software module or component may include any type of computer instruction or computer-executable code located within a memory device and/or computer-readable storage medium. A software module may, for instance, comprise one or more physical or logical blocks of computer instructions, which may be organized as a routine, a program, an object, a component, a data structure, etc., that perform one or more tasks or implement particular data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Suitable software to assist in implementing the invention is readily provided by those of skill in the pertinent art(s) using the teachings presented here and programming languages and tools, such as Java, JavaScript, Pascal, C++, C, database languages, APIs, SDKs, assembly, firmware, microcode, and/or other languages and tools.

Embodiments as disclosed herein may be computer-implemented in whole or in part on a digital computer. The digital computer includes a processor performing the required computations. The computer further includes a memory in electronic communication with the processor to store a computer operating system. The computer operating systems may include, but are not limited to, MS-DOS, Windows, Linux, Unix, AIX, CLIX, QNX, OS/2, and MacOS. Alternatively, it is expected that future embodiments will be adapted to execute on other future operating systems.

It will be obvious to those having skill in the art that many changes may be made to the details of the above-described embodiments without departing from the underlying principles of the invention. The scope of the present invention should, therefore, be determined only by the following claims.

What is claimed is:

1. A system for providing access to digital content, comprising:
    one or more processors in electrical communication with a network interface, the one or more processors to:
        receive, via the network interface, a content request for a digital content item requested by a user;
        determine a digital resource provisioning platform including the digital content item;
        determine a link to the digital content item on the digital resource provisioning platform according to a link creation rule selected from a plurality of rules each specific to one of a plurality of digital resource provisioning platforms; and
        provide to a client computing device, via the network interface, the link to the digital content item, the link to provide a user interface direct access to display the digital content item responsive to a user opening the link.

2. The system of claim 1, wherein the link creation rule comprises a listing of links for each digital content item on the selected digital resource provisioning platform.

3. The system of claim 2, wherein a link of the listing of links comprises a direct link to the digital content item on the digital resource provisioning platform.

4. The system of claim 1, wherein the one or more processors are further to:
    process holdings availability data indicating that the user-requested digital content item is available to the user on the selected digital resource provisioning platform,
    wherein the holdings availability data comprises a report describing one or more content sets available on a given digital resource provisioning platform of the plurality of digital resource provisioning platforms.

5. The system of claim 1, wherein the one or more processors further to:
    process holdings availability data indicating that the user-requested digital content item is available to the user on the selected digital resource provisioning platform,
    wherein the holdings availability data maps each of a plurality of content sets to the digital resource provisioning platform upon which the respective content set is available to the user, each of the plurality of content sets including one or more digital content items.

6. The system of claim 1, wherein the link creation rule indicates use of a link template.

7. The system of claim 6, wherein the one or more processors further to:
    obtain a digital resource identifier corresponding to the user-requested digital content item,
    wherein the link is generated by placing the digital resource identifier into a variable field of the link template.

8. The system of claim 6, wherein the one or more processors further to:
    obtain a content set identifier corresponding to the user-requested digital content item,
    wherein the link is generated by placing the content set identifier into a variable field of the link template.

9. The system of claim 1, wherein the user interface is a web browser.

10. The system of claim 1, wherein determining the digital resource provisioning platform including the digital content item comprises:
    obtaining holdings availability data for one or more of the plurality of digital resource provisioning platforms; and
    selecting the digital resource provisioning platform from the one or more of the plurality of digital resource provisioning platforms.

11. A system to provide a user access to a digital content item, comprising:
    one or more processors in electrical communication with a network interface; and
    a memory having instructions stored thereon that, when executed by the one or more processors, cause the system to:
        receive, from a client computing device, a user request for the digital content item;
        determine a digital resource provisioning platform based on holdings availability data for the digital resource provisioning platform, the holdings availability data describing availability of the digital content item on the digital resource provisioning platform; and
        provide to the client computing device, via the network interface, a link to the digital content item on the digital resource provisioning platform,
        wherein the link is according to a link creation rule specific to the digital resource provisioning platform and the link creation rule is selected from a plurality of rules each specific to one of a plurality of digital resource provisioning platforms, and
        wherein the link is to direct a user interface to access the digital content item responsive to a user accessing the link.

12. The system of claim 11, wherein the link creation rule comprises a listing of links each for a digital content item on the selected digital resource provisioning platform.

13. The system of claim 12, wherein a link of the listing of links comprises a direct link to fully access the digital content item completely.

14. The system of claim 11, wherein the link creation rule indicates use of a link template.

15. The system of claim 14, wherein the instructions, when executed by the one or more processors, further cause the system to:
    obtain a digital resource identifier corresponding to the user-requested digital content item, wherein the link is generated by placing the digital resource identifier into a variable field of the link template.

16. The system of claim 11, wherein the user interface is a web browser.

17. The system of claim 11, wherein determining the digital resource provisioning platform including the digital content item comprises:
    obtaining the holdings availability data for the digital resource provisioning platform; and
    selecting the digital resource provisioning platform, among one or more of a plurality of digital resource provisioning platforms, according to the holdings availability data.

18. A computer-implemented method for providing access to digital content, comprising:
    receiving at a computing device a content request for a digital content item requested by a user;
    determining, on the computing device, a digital resource provisioning platform; and
    providing a link to the digital content item on the digital resource provisioning platform, wherein the link is according to a link creation rule specific to the digital resource provisioning platform and the link creation rule is selected from a plurality of rules each specific to one of a plurality of digital resource provisioning platforms, and
    wherein the link is to direct a user interface directly to a view of the digital content item responsive to a user accessing the link.

19. The method of claim 18, wherein the link creation rule comprises a listing of links each for a digital content item on the selected digital resource provisioning platform.

20. The method of claim 18, wherein the link creation rule is further based on an affiliation of the user.

* * * * *